United States Patent
Henry et al.

(10) Patent No.: US 10,805,638 B2
(45) Date of Patent: Oct. 13, 2020

(54) METHOD FOR CODING A DIGITAL IMAGE, DECODING METHOD, DEVICES, TERMINAL EQUIPMENT AND RELATED COMPUTER PROGRAMS

(71) Applicant: B<>COM, Cesson Sevigne (FR)

(72) Inventors: Felix Henry, Saint George (FR); Gordon Clare, Pace (FR)

(73) Assignee: B<>COM, Cesson Sevigne (FR)

( * ) Notice: Subject to any disclaimer, the term of this patent is extended or adjusted under 35 U.S.C. 154(b) by 0 days.

(21) Appl. No.: 16/338,878

(22) PCT Filed: Sep. 12, 2017

(86) PCT No.: PCT/FR2017/052422
§ 371 (c)(1),
(2) Date: Apr. 2, 2019

(87) PCT Pub. No.: WO2018/065687
PCT Pub. Date: Apr. 12, 2018

(65) Prior Publication Data
US 2020/0195969 A1    Jun. 18, 2020

(30) Foreign Application Priority Data
Oct. 3, 2016 (FR) .................................... 16 59493

(51) Int. Cl.
*H04N 19/61* (2014.01)
*H04N 19/513* (2014.01)

(52) U.S. Cl.
CPC .......... *H04N 19/61* (2014.11); *H04N 19/521* (2014.11)

(58) Field of Classification Search
CPC .......... H04N 19/61–521; H04N 19/48; H04N 19/91; H04N 19/463
(Continued)

(56) References Cited

U.S. PATENT DOCUMENTS

2002/0171759 A1 * 11/2002 Handjojo .............. H04N 7/014
                                                            348/452
2007/0147506 A1 *  6/2007 Kwon .................... H04N 19/51
                                                          375/240.16
(Continued)

FOREIGN PATENT DOCUMENTS

FR            3023112 A1      1/2016

OTHER PUBLICATIONS

International Search Report dated Jan. 5, 2018 for corresponding International Application No. PCT/FR2017/052422, filed Sep. 12, 2017.
(Continued)

*Primary Examiner* — Tung T Vo
(74) *Attorney, Agent, or Firm* — David D. Brush; Westman, Champlin & Koehler, P.A.

(57) ABSTRACT

A method for coding a digital image divided into blocks. The method includes, for a current block: processing the current block to provide a vector of transformed coefficients; selecting a sequence of M signs of coefficients to be predicted in the coefficient vector, M being an integer greater than or equal to 2; predicting values of the signs from a plurality of assumptions of combinations and a cost function; and for a sign of the sequence, coding an indicator representing a difference between its actual value and its predicted value. The predicting includes, for at least one second, current assumption: obtaining a pixel vector associated with the current assumption, by linear combination of at least one pixel vector associated with a first assumption and at least one pattern vector obtained from the vector of transformed coefficients; an calculating the cost function for the current assumption from the pixel vector obtained.

18 Claims, 8 Drawing Sheets

Figure 1:
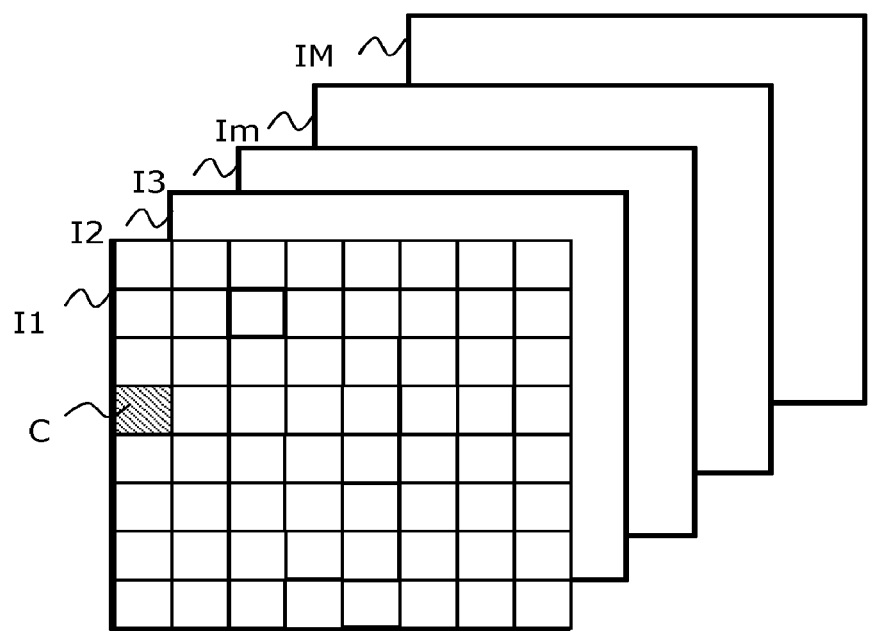

(58) Field of Classification Search
USPC .................................................... 375/240.16
See application file for complete search history.

(56) References Cited

U.S. PATENT DOCUMENTS

| | | |
|---|---|---|
| 2007/0183504 A1* | 8/2007 | Hoffman ................ G06T 7/223 375/240.16 |
| 2013/0044808 A1 | 2/2013 | Nakagawa et al. |
| 2017/0142444 A1 | 5/2017 | Henry |

OTHER PUBLICATIONS

Written Opinion of the International Searching Authority dated Jan. 5, 2018 for corresponding International Application No. PCT/FR2017/052422, filed Sep. 12, 2017.

English translation of the Written Opinion of the International Searching Authority dated Jan. 15, 2018 for corresponding International Application No. PCT/FR2017/052422, filed Sep. 12, 2017.

Koyama J. et al., "Coefficient sign bit compression in video coding", IEEE Picture Coding Symposium, May 7, 2012 (May 7, 2012), pp. 385-388, XP032449909.

French Search Report and Written Opinion dated Jul. 19, 2017 for corresponding French Application No. 1659493, filed Oct. 3, 2016.

Sole et al, "Transform Coefficient Coding in HEVC", published in the journal, IEEE Transactions on Circuits and Systems for Video Technology, vol. 22, No. 12, in Dec. 2012.

Ponomarenko et al., "Prediction of signs of DCT coefficients in block-based lossy image compression", published in Image Processing: Algorithms and Systems, Proceedings of the SPIE, vol. 6497 in Feb. 2007.

\* cited by examiner

METHOD FOR CODING A DIGITAL IMAGE, DECODING METHOD, DEVICES, TERMINAL EQUIPMENT AND RELATED COMPUTER PROGRAMS

1. CROSS-REFERENCE TO RELATED APPLICATIONS

This Application is a Section 371 National Stage Application of International Application No. PCT/FR2017/052422, filed Sep. 12, 2017, the content of which is incorporated herein by reference in its entirety, and published as WO 2018/065687 on Apr. 12, 2018, not in English.

2. FIELD OF INVENTION

The field of the invention is that of the encoding and decoding of images or sequences of images, and in particular of video streams.

More specifically, the invention relates to the compression of images or sequences of images using a block representation of the images.

The invention may especially apply to the image or video encoding implemented in the current encoders (JPEG, MPEG, H.264, HEVC, etc. and their amendments) or to future ones, and to the corresponding decoding process.

3. PRIOR ART

We consider a conventional compression scheme of a digital image, according to which the image is divided into blocks of pixels. A current block to be coded is predicted from a previously coded decoded block. A residual block is obtained by subtracting the original values from the predicted values. It is then transformed using a DCT type transformation (for "Discrete Cosine Transform") or wavelets. The transformed coefficients are quantized and their amplitudes are subjected to entropic coding of the Huffmann or arithmetic type. Such coding provides efficient performances because, due to the transformation, the values of the amplitudes to be coded are mostly equal to zero.

On the other hand, it does not apply to the values of the signs of the coefficients, whose+ and − values are generally associated with equivalent appearance probabilities. Thus, the signs of the coefficients are coded by a bit 0 or 1.

We know of the French patent application published under the number FR3023112 selecting the signs of the coefficients to be predicted in the current block according to a score associated with a coding context of the coefficient, the score being representative of a reliability level of a prediction of the sign.

One advantage is that it ensures that for a large majority of predicted signs, the prediction indicator will indicate a correct prediction and thus provide a favourable context for entropy coding. In this way, compression performance is increased.

A disadvantage of this technique is that it requires, for M signs to be predicted, to evaluate the prediction obtained for each of the $2^M$ combinations of values of these signs and, to do this, to reconstruct the current block from this prediction. Such a reconstruction notably requires the transformation of the prediction residue of the current block, which introduces a significant complexity on the coder side as the decoder side.

4. SUMMARY

An embodiment of the invention relates to a method for coding a digital image, said image being divided into a plurality of blocks of pixels processed in a defined order, said method comprising the following steps, implemented for a current block:

Processing the current block for providing a vector of transformed coefficients;

Selecting a sequence of M signs of coefficients to be predicted in the coefficient vector, with M being an integer greater than or equal to 2;

Predicting values of the signs of the sequence from a plurality of assumptions of combinations and a cost function;

For a sign of the sequence, coding an indicator representative of a difference between its actual value and its predicted value;

According to the invention, the prediction step comprises the following substeps:

for at least one second assumption, so-called current assumption:

Obtaining a pixel vector associated with the current assumption, by linear combination of a pixel vector associated with at least one first assumption and obtained by transforming a vector of coefficients comprising the combination of signs of the first assumption previously processed and different from the current assumption by the value of at least one sign (sj), with j an integer between 0 and M, and at least one pixel pattern vector obtained by transforming a coefficient vector (VMj) associated with said at least one sign (sj) of the sequence, of the same dimension as the vector of transformed coefficients, and comprising an amplitude coefficient equal to that of said vector at the position of the coefficient corresponding to the sign sj in said vector, all the other coefficients being set to zero;

Calculating the cost function for the current assumption from the pixel vector obtained.

With the invention, the pixel vector associated with the current assumption is obtained by simple linear combination of a pixel vector associated with an assumption already processed and at least one pattern vector of pixels previously calculated, without needing to resort to the application of a transform.

The pixel pattern vector is obtained by transforming a coefficient vector, comprising a single non-zero coefficient, which makes the operation much less complex.

Since the coefficient pattern vectors comprise a single non-zero coefficient, the application of the inverse transform generates a very moderate calculation cost. Indeed, for a current block of size N×N pixels of which all the coefficients are likely to be non-zero, for a normal inverse transform N×N projections on basic vectors of dimension N×N are necessary. We need $N^4$ multiplications and $N^4$ additions. On the other hand, in the case of a coefficient vector of coefficients, because a priori only a single coefficient is non-zero, there remains only one projection to realise, i.e. $N^2$ multiplications and $N^2$ additions.

The pixel vector of the current assumption is constructed by linear combination of the pixel vector associated with an already processed assumption and as many vectors as there are sign differences between the current assumption and this assumption.

The invention is based on an entirely new and inventive approach to prediction, which consists in exploiting the result of the processing of at least one previous assumption in order to more effectively address the current assumption.

The evaluation of the costs of the different assumptions of sign prediction combinations is therefore simplified, without prejudice to the quality of this evaluation and the resulting prediction decision.

Correspondingly, the invention also relates to a method for decoding a digital image from a bitstream, said image being divided into a plurality of blocks processed in a defined order, the bitstream comprising, for a block, coded data representative of a vector of transformed coefficients, said method comprising the following steps, implemented for a block, so-called current block:

Decoding the amplitudes of the coefficients of the vector of transformed coefficients, extracted from the bitstream;

Selecting a sequence of M signs of coefficients to be predicted in the coefficient vector, with M being an integer greater than or equal to 2;

Predicting values of the signs of the sequence from a plurality of assumptions of combinations and a cost function;

Decoding values of a prediction indicator of the signs selected from coded data extracted from the bitstream, the prediction indicator of a sign being indicative of a difference between its actual value and its predicted value;

Calculating the decoded values of the selected signs from the decoded prediction indicator values and the predicted values;

Reconstructing coefficients of the block from decoded amplitudes and decoded signs;

According to the invention, the prediction step comprises the following substeps:

for at least one second assumption, so-called current assumption:

Obtaining a pixel vector associated with the current assumption, by linear combination of a pixel vector associated with at least a first assumption previously processed and different from the current assumption by the value of at least one sign (sj), with j an integer between 0 and M, and obtained by transforming a coefficient vector comprising the combination of signs of the first assumption and at least one pixel pattern vector obtained by transforming a coefficient vector (VMj) associated with said at least one sign (sj) of the sequence, of the same dimension as the vector of transformed coefficients, and comprising an amplitude coefficient equal to that of said vector at the position of the coefficient corresponding to the sign sj in said vector, all the other coefficients being set to zero;

Calculating the cost function for the current assumption from the pixel vector obtained.

Thus, the same mechanism applies to the decoder as well as to the encoder. To find the prediction used by the encoder and to determine the value of the prediction indicators of the signs to be predicted from the current block, the decoder evaluates the different sign prediction assumptions according to the principle of the invention and in a manner similar to the encoder.

Advantageously, the step of obtaining at least one pattern vector is implemented M times and the step of obtaining a pixel vector by transforming at least one vector of coefficients is carried out for M+1 first assumptions.

In this way, the number of transformations to be applied is decreased, down to the number M+1 pixel vectors to be calculated.

The pixel vectors of the other assumptions can then all be obtained by linear combination of these M pattern vectors and M+1 pixel vectors.

The state of the art implements $2^M$ transformations, each of $N^4$ complexity, i.e.: $2^M \times N^4$ multiplications and $2^M \times N^4$ additions, while the invention implements M+1 transformations and $2^M-M-1$ linear combinations, representing $(M+1) \times N^4$ multiplications and $(M+1) \times N^4 + (2^M-M-1) \ast N^2$ additions.

If we approximate in a real case (N is large and M small), the complexity of the state of the art is in $O(2^M \times N^4)$ and that of the invention in $O(M \times N^4)$ which is much lower: for the variable M, we go from exponential complexity to linear complexity.

Advantageously, to obtain the pixel vector, the sign of the non-zero coefficient is chosen equal to +.

An advantage of this solution is its simplicity. Of course, we could choose other sign values.

Advantageously, said at least one pattern vector is calculated in a step prior to the processing of the assumptions and stored in memory and obtaining said at least one pattern vector comprises reading said memory.

According to this embodiment, since the obtaining of the pattern vectors is not dependent on the pixel vectors of previous assumptions, it can be done at the initialisation of the prediction step for the current block.

Advantageously, M vector patterns are calculated beforehand and the step of obtaining a pixel vector is performed for a single first assumption.

In this way, the number of transformations to be applied is minimised. Among the M+1 transformations implemented, M are applied to vectors comprising only one non-zero coefficient. The operation is therefore overall very little complex.

According to another aspect of the invention, the cost function is calculated for a subset of the pixels of a pixel vector, said subset comprising at least the pixels located at a boundary of the current block with a neighbouring block already processed and the transforming step transforms the coefficient vector into a sub-vector of pixels corresponding to said subset.

A particular transform is used which reconstructs only the pixels needed to evaluate the cost function. One advantage is a reduction in the complexity of the evaluation of the cost function.

The various embodiments or features mentioned below may be added independently or in combination with each other, to the characteristics of the decoding method and/or coding method defined above.

The invention also relates to a coding device adapted to implement the coding method according to any one of the particular embodiments defined above. This coding device may of course include the various characteristics relating to the coding method according to the invention. Thus, the characteristics and advantages of this coding device are the same as those of the decoding method, and are not detailed further.

The invention also relates to a decoding device adapted to implement the decoding method according to any one of the particular embodiments defined above. This decoding device may of course include the various characteristics relating to the decoding method according to the invention. Thus, the characteristics and advantages of this decoding device are the same as those of the decoding method, and are not detailed further.

Correlatively, the invention also relates to a terminal equipment comprising a transmission module and a data receiving module to and from a telecommunications network, a coding device and a decoding device according to the invention.

The invention also relates to a computer program comprising instructions for implementing the steps of a coding method as described above, when this program is executed by a processor.

The invention also relates to a computer program comprising instructions for implementing the steps of a decoding method of a digital image as described above, when this program is executed by a processor.

These programs can use any programming language. They can be downloaded from a communication network and/or recorded on a computer-readable medium.

The invention finally relates to recording media, which are readable by a processor, whether or not integrated into the coding device of a digital image and to the device for decoding a digital image according to the invention, which might be removable, respectively storing a computer program implementing a coding method and a computer program implementing a decoding method, as described above.

5. LIST OF FIGURES

Figure 3:
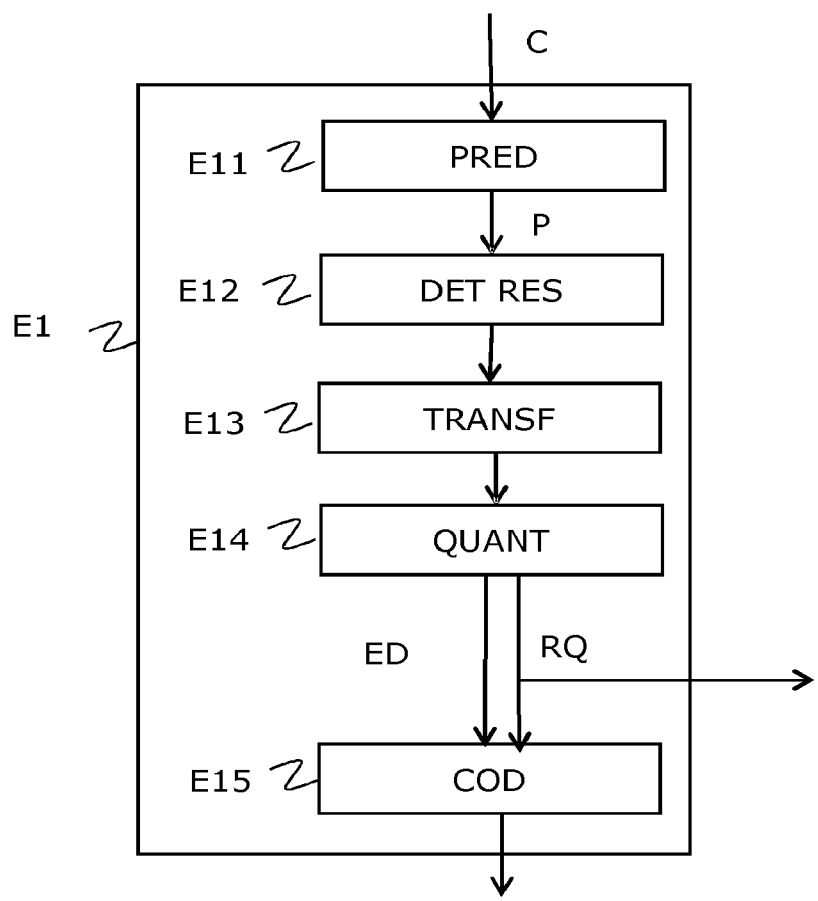
Figure 2:
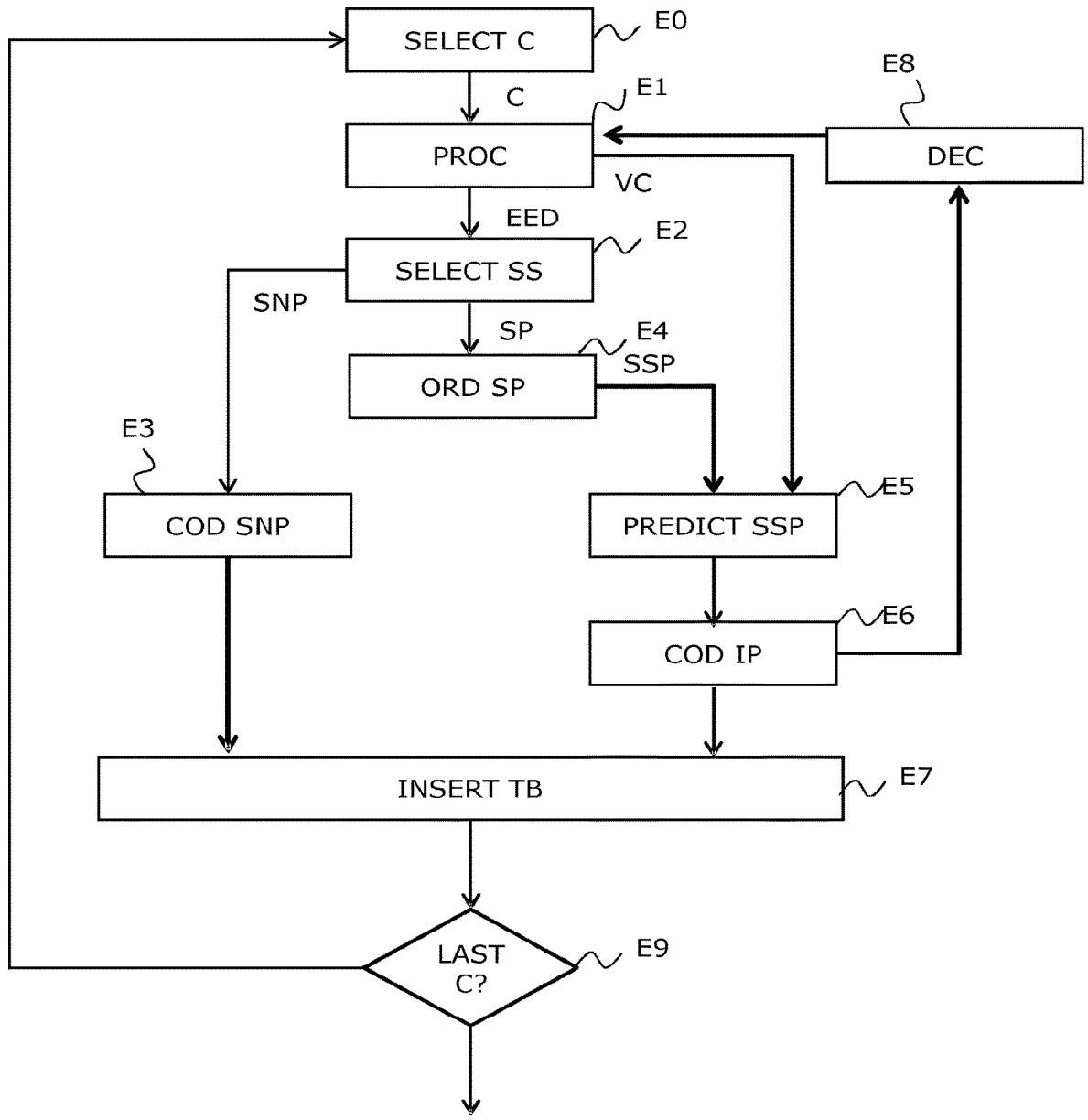
Figure 4A:
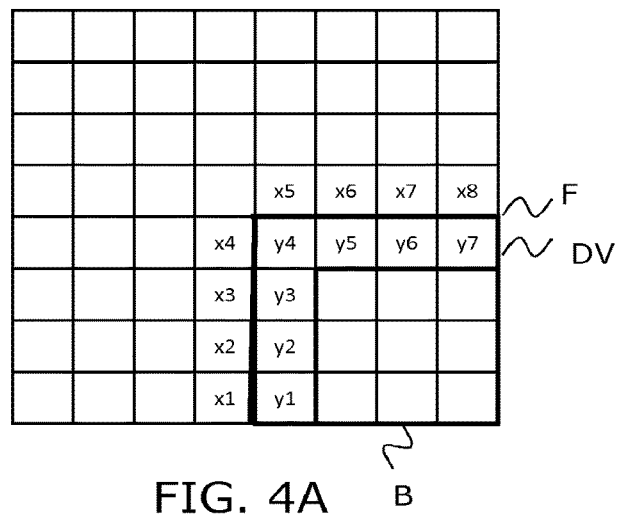
Figure 4B:
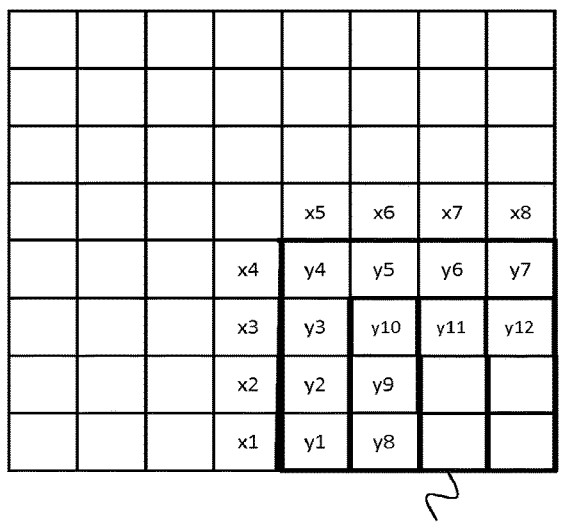
Figure 4C:
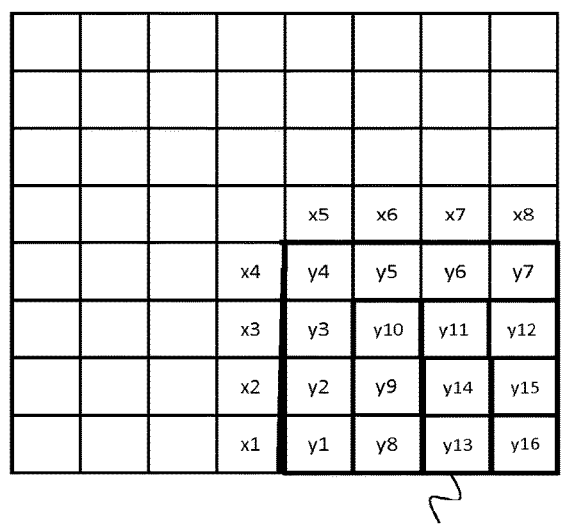
Figure 5:
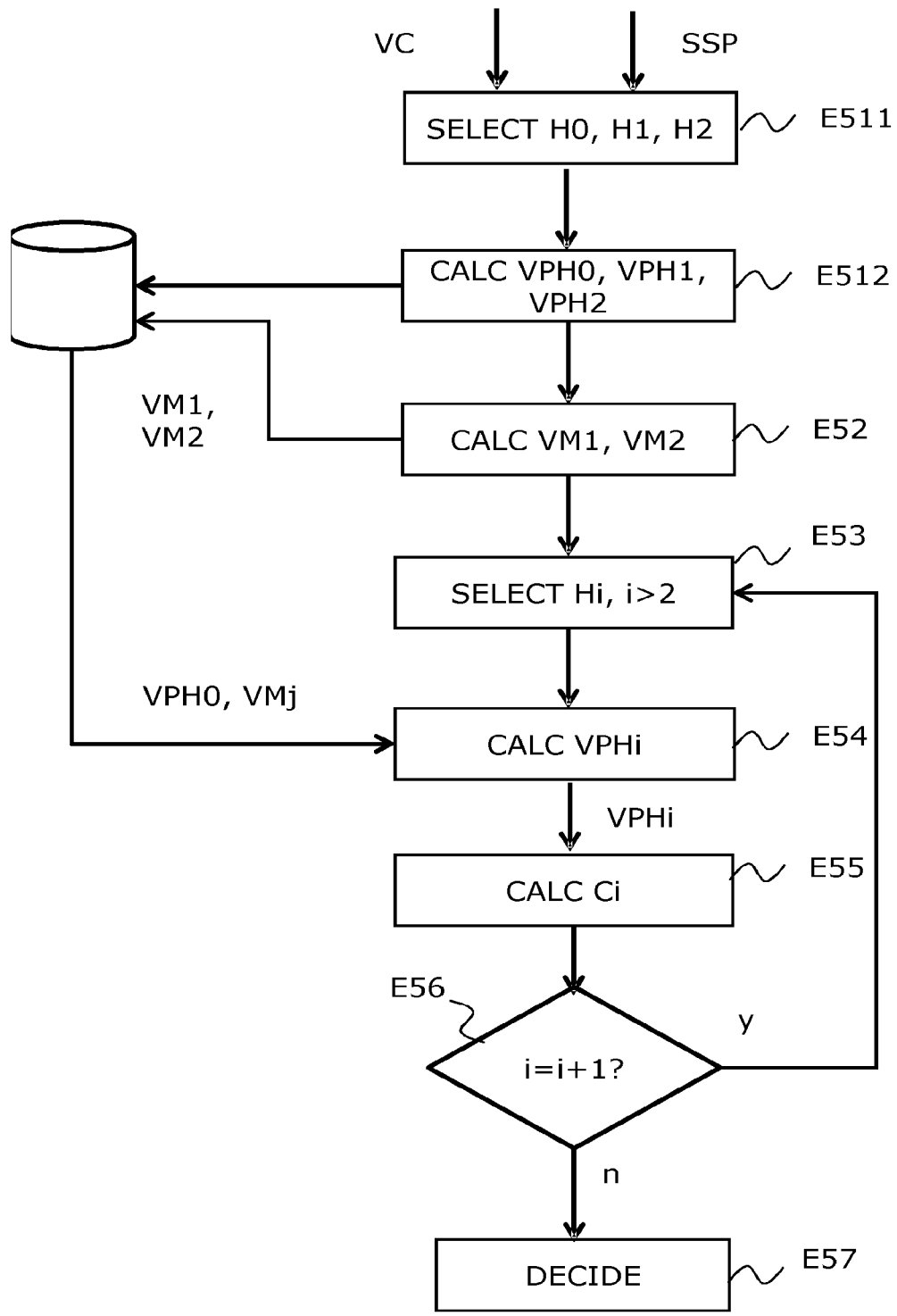
Figure 6:
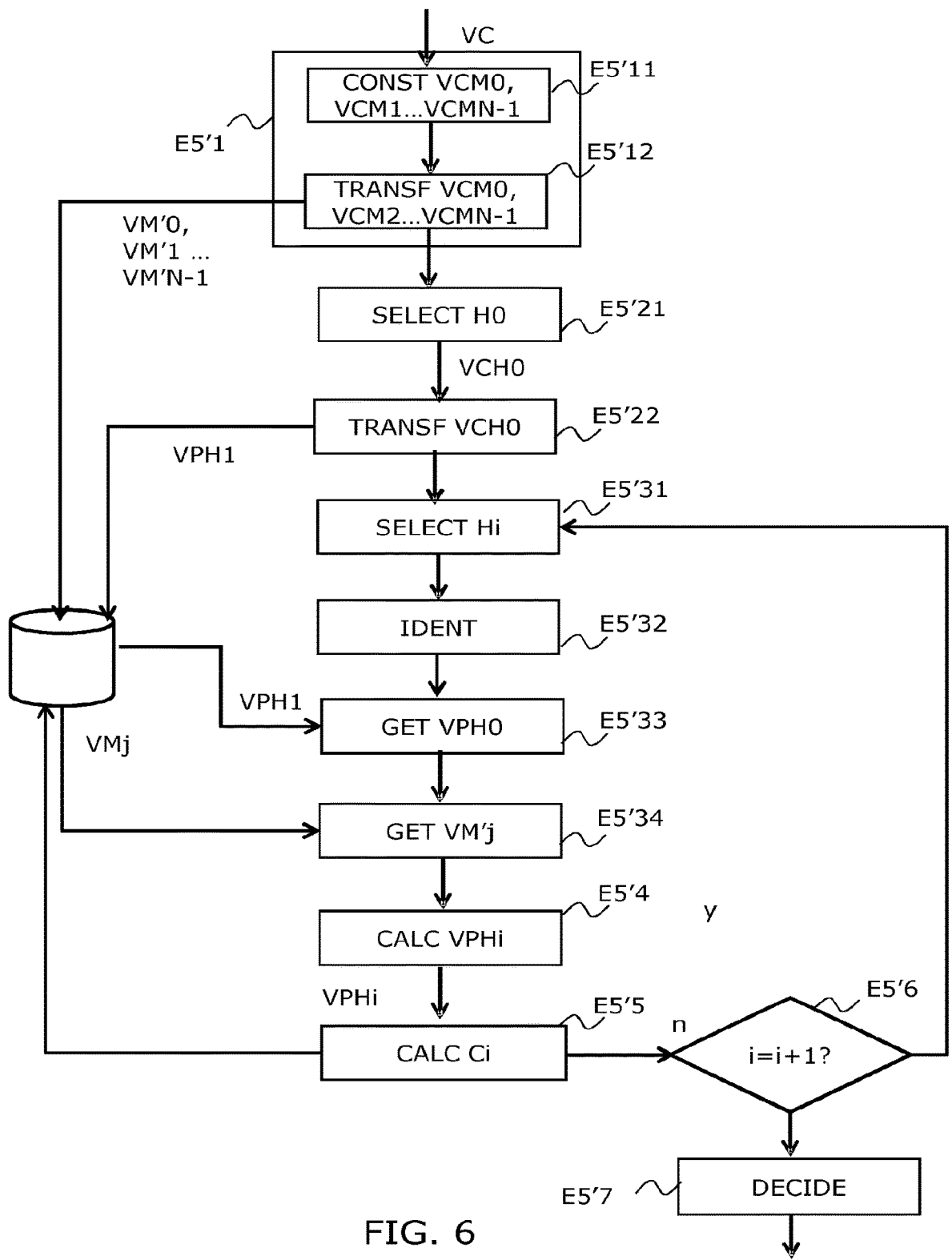
Figure 7:
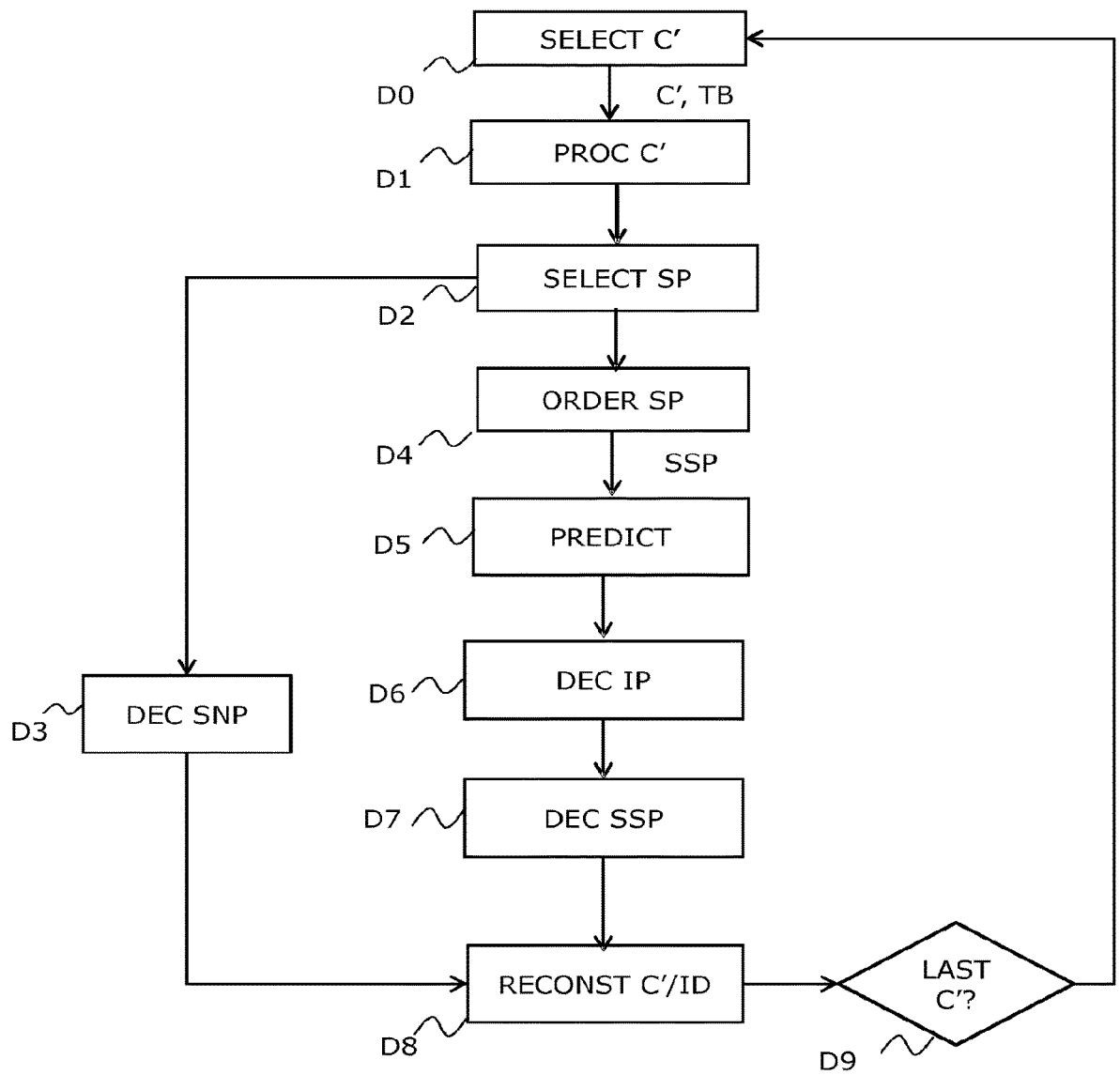
Figure 8:
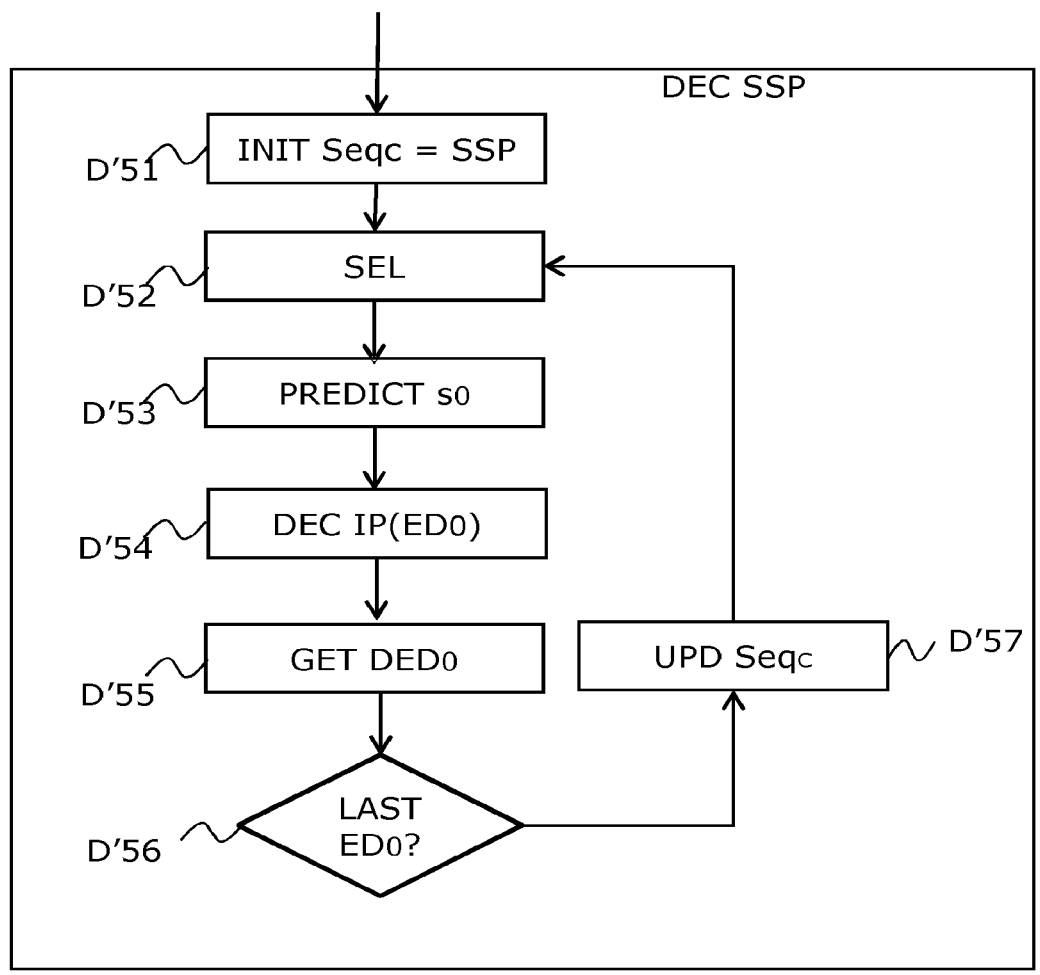
Figure 9:
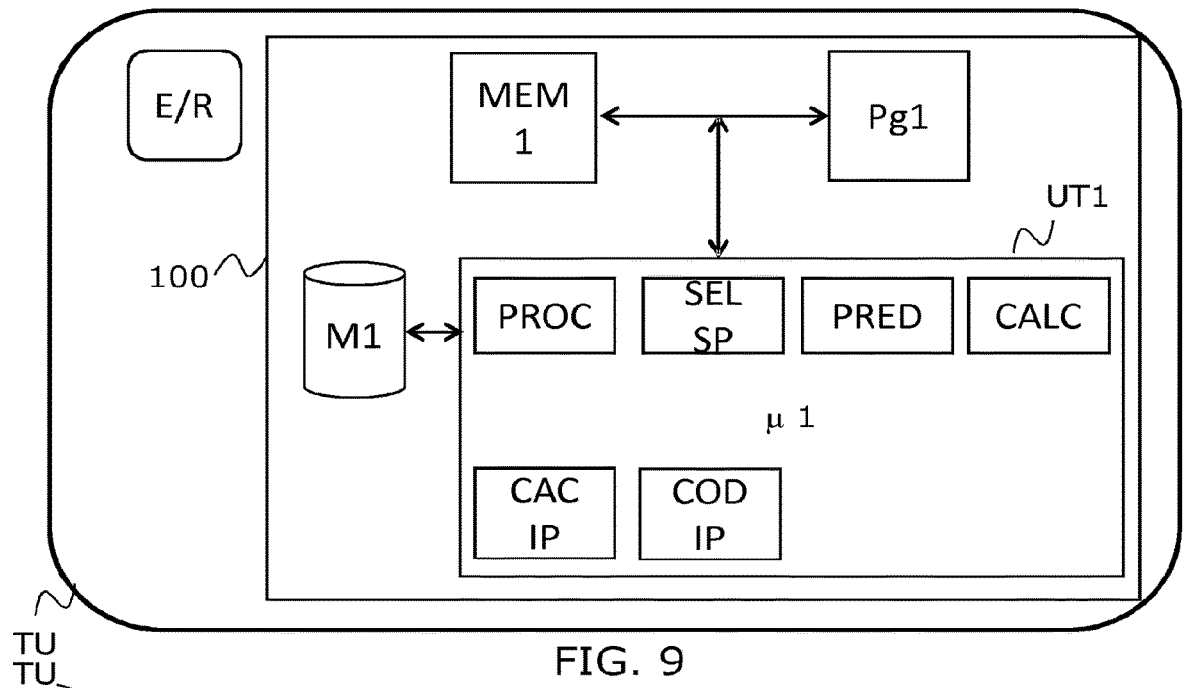
Figure 10:
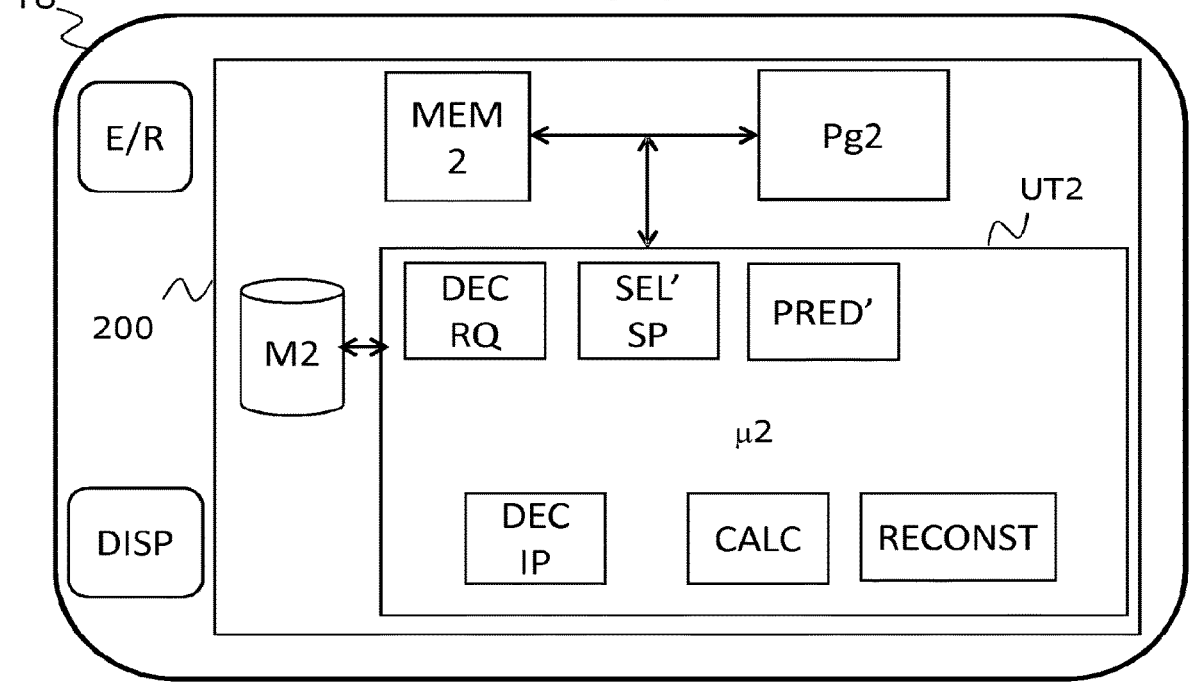

Other features and advantages of the invention will appear more clearly on reading the following description of an embodiment of the invention, given as a simple illustrative and non-limiting example, and the appended drawings among which:

FIG. 1 schematically shows a sequence of digital images cut into blocks;

FIG. 2 schematically shows the steps of a method for coding images according to the invention;

FIG. 3 details the processing step of a current block;

FIGS. 4A to 4C schematically illustrate the pixels of the current block and of the neighbouring blocks already processed implemented for the evaluation of a cost function;

FIG. 5 describes in detail the step of predicting signs of the current block according to a first embodiment of the invention;

FIG. 6 describes in detail the step of predicting a sequence of signs of the current block according to a second embodiment of the invention;

FIG. 7 schematically shows the steps of a method for decoding an image according to the invention;

FIG. 8 details an example of a method for selecting the best combination of signs when decoding according to the invention;

FIG. 9 schematically shows the hardware structure of a device for coding an image according to the invention, when it is integrated with a terminal equipment; and FIG. 10 schematically shows the hardware structure of a device for decoding an image according to the invention, when it is integrated with a terminal equipment.

6. DESCRIPTION OF A PARTICULAR EMBODIMENT OF THE INVENTION

The general principle of the invention relates to the prediction of signs of the current block and rests on a reconstruction of the decoded block for a combination of sign values to be predicted, based on reusing the results obtained for combinations of values already evaluated. More specifically, the invention consists in calculating a decoded pixel vector of the current block for a current assumption by combining at least one decoded pixel vector already calculated for at least one preceding assumption and at least one pixel pattern vector previously calculated.

In relation to FIG. 1, an original video consisting of a sequence of M images I1, I2, . . . Im, with M a non-zero integer, is considered. The images are encoded and decoded in a predefined order known from the encoder and the decoder, for example in the time order I1, then I2, . . . , then IM (this order may differ according to the embodiment).

When encoding an image, it is subdivided into blocks C of maximum size which can in turn be subdivided into smaller blocks.

In relation to FIG. 2, the steps of a method of coding an image Im according to the invention are described. During a step E0, a first block is selected.

In E1, the current block C undergoes a sequence of operations E1 (applying prediction steps, calculating a residue, quantising, entropy coding) which will now be detailed in relation with FIG. 3.

For example, the first block to be processed is selected as the current block C. In the preferred embodiment, it is the first block (in lexicographic order). It has N×N pixels, with N a non-zero integer, but of course, the invention would apply similarly to a rectangular block.

It is assumed that there are L possible cuts into block numbered from 1 to L, and that the cut used on block C is the cut number 1. For example, there may be 4 possible cuts, in blocks of size 4×4, 8×8, 16×16, and 32×32.

On the other hand, the decoded current picture (which, in a video encoder, is built into the encoder so as to allow a prediction of subsequent blocks of the video) will be noted ID.

During a step E11, a prediction Pr of the block C is determined. It is a prediction block constructed by known means, typically by motion compensation (block from a previously decoded reference image), or by intra prediction (block constructed from decoded pixels immediately close to the current block in the image ID). The prediction information related to P is encoded in the compressed file. It is assumed here that there are K possible prediction modes m1, m2, . . . , mK, and that the prediction mode chosen for block C is the mode mkj.

In E12, an original residue block R is formed by difference between the current block and the predicted block R=C−P.

In E13, the residue R is transformed by a DCT transform or into a wavelet, known per se (REF JPEG standard DCT, JPEG2000 standard for wavelet transform), into a block called RT.

In E14, the transformed residue RT is quantized by conventional quantization means, for example scalar or vector, into a quantized residual block RQ. This quantized block RQ contains N×N coefficients. As known in the state of the art, these coefficients are scanned in a predetermined order so as to constitute a one-dimensional vector RQ[i] where the index i varies from 0 to $N^2-1$. The index i is called the frequency of the coefficient RQ [i]. Classically, these coefficients are scanned in increasing order of frequency, for example according to a diagonal scan as described in the document by Sole et al, entitled «Transform Coefficient Coding in HEVC», published in the journal «IEEE TRANSACTIONS ON CIRCUITS AND SYSTEMS FOR VIDEO TECHNOLOGY, VOL. 22, NO. 12, in December 2012.

In E15, the amplitude information of the RQ coefficients is encoded by entropy coding (Huffman coding or arithmetic coding). By amplitude, here is meant the absolute value of the coefficient. Amplitude coding means are for example described in the HEVC standard (explained in Sole J. et al., «Transform Coefficient Coding in HEVC», IEEE Transactions on Circuits and Systems for Video Technology, vol. 23, no. 12, December 2012).

Conventionally, a piece of information representative of the fact that the coefficient is non-zero, can be encoded for each coefficient. Then, for each non-zero coefficient, one or more pieces of information relating to the amplitude are encoded.

All the steps which will now be detailed apply to the sign information. However, the invention is valid for any other descriptive information of the compressed image (syntax element). For example, the invention can be applied to the significance information (a syntax element representative of the zero or non-zero value of a transformed coefficient amplitude), an amplitude information, a mode information of coding (inter or intra for example), etc.

In relation with FIG. 2, a step E2 selects the signs to be predicted, in the current block, according to known prior probabilities, as described in document FR3023112 already cited. The encoder may use a set of probabilities for correct detection of sign, also called scores. In the preferred embodiment, these probabilities are dependent on the size of the current block C, the amplitude of the coefficient associated with the sign, its frequency, and the prediction mode used among the K possible modes.

These probabilities were constructed before encoding and decoding, either by statistical accumulation on a set of signals representative of the signals to be coded, or by mathematical calculation from assumptions on the distribution of the signs of the coefficients.

For each coefficient RQ[i], a correct prediction probability of the sign of the coefficient RQ[i] can be obtained.

Advantageously, the signs to be predicted are selected while keeping those whose probability is greater than a predetermined threshold.

During a step E3, the set of SNP signs of RQ which are not predicted are encoded conventionally. Thus, it is known in the HEVC standard to transmit each sign in the form of a binary element 0 or 1, with a convention associating one with the plus sign and the other with the minus sign.

During a step E4, the signs to be predicted SP are scheduled. This order can be predefined: for example, in the scanning order of the signs as defined in the HEVC standard. In the preferred embodiment, the signs are ordered by decreasing probability of correct detection. Thus, let us assume that we have at this stage a sequence of M ordered signs to be predicted $SP=\{s0, s1, \ldots, sM-1\}$.

During a step E5, the M signs of the sequence SP are predicted.

The purpose is to select the best assumption of combination of the values of M signs of the sequence SP among $2^M$ possible assumptions.

By way of example, a cost associated with each assumption is evaluated using a cost function FC and the assumption that minimizes the cost function is chosen.

Thus, for a given assumption, this function FC produces a cost, for example FC $(\{s1=+, s2=-, s3=-, \ldots, sM-1=+\})$ =4240.

Here, the assumption is $\{+, -, -, \ldots, +\}$ and the resulting cost is 4240. Of course, the evaluation function must make sure to generate a minimal cost when the sign assumption is the most likely.

Cost functions are described in the state of the art for example in the document by Ponomarenko et al., entitled «Prediction of signs of DCT coefficients in block-based lossy image compression», published in Image Processing: Algorithms and Systems, Proceedings of the SPIE, Volume 6497 in February 2007, whose principle will be described below.

For example, the cost function measures a distortion along the left and top border of the current block, as shown in FIG. 4A. The decoded pixels y1 to y8 coming from the blocks previously processed are situated on one side of a border of the current block C, and on the other side, the pixels x1 to x7 of the current block decoded with the assumption of signs of which the cost is to be measured.

To generate a decoded current block corresponding to an assumption of signs, the process is as follows:
  each coefficient of the residual block is allocated its real sign (if there is a coefficient whose sign is not predicted), or the sign assumption (if it is a coefficient whose sign is to be predicted).
  using conventional means for dequantising and inverse transform, a block of decoded residual is obtained, in particular the residual samples $\{r1, r2, \ldots, r7\}$ neighbouring the boundary of the block with previously decoded blocks;
  the predicted block P is then added to them to produce a decoded block DV.

It is not necessary to reconstruct the complete block and it may be enough to reconstruct the pixels x1 to x7 which are situated along the border. In connection with FIG. 4A, the cost function FC is obtained from the calculation of a difference between the values of x1 pixels x7 located in the blocks previously processed, and y1 to y7 pixels located on the first line and the first column of the current block.

Of course, other cost measurements can be considered. For example, a cost measurement could be based not only on the pixels located at the borders, but also on the interior pixel rows, neighbouring the previous ones, as shown by FIGS. 4B to 4C. Thus, in FIG. 4B, the difference is calculated between the values of the pixels of previously processed blocks and the pixels y1 to y12 located on the first line, the first column as well as the second line and the second column of the current block. For example, we evaluate the difference between y1 and x1 and y8 and x1 and, similarly, between y2 and x2 and y9 and x2, and so on.

In the example shown in FIG. 4C, the difference is calculated between the values of the pixels located in the previously processed blocks, and all the pixels of the current block.

Subsequently, the vector consisting of the decoded pixels of the current block used to calculate the cost function for the $k^{th}$ assumption on the signs will be designed VDk.

The vector VDk can be written VDk=P+VPHk, where P is the prediction vector of the current block, or advantageously a sub-vector restricted for example to the pixels y1 to y7 or still to the pixels y1 to y12 and VPHk is the decoded residual vector corresponding to the $k^{th}$ assumption Hk on the signs or, a sub-vector restricted for example to the pixels y1 to y7 or to the pixels y1 to y12.

To predict the sequence of M signs of the current block, the costs associated with each assumption of combinations of the sign values are generated using a cost function FC. For these costs, it is necessary to calculate the decoded residual blocks associated with each assumption, hence the vectors of pixels VPH0 to VPH $2^M$.

In the state of the art it was necessary to completely recalculate these vectors. However, this process is computationally intensive, in particular because the calculation of the residual vector VPHk requires the application of an inverse transform each time, which requires significant computational resources.

In order to avoid having to calculate all these inverse transforms, the invention proposes a simplifying solution, two particular embodiments of which will now be described with reference to FIGS. 5 and 6.

In connection with FIG. 5, where the assumptions are browsed according to a predetermined order. Advantageously, the assumptions are browsed in an order such that the sign of a single coefficient changes between two consecutive assumptions. This order is known to a person having ordinary skills in the art as "Gray code" or "reflected binary code".

In the particular case where the sequence of signs to be predicted comprises M=3 signs {s0, s1, s2}, the assumptions will be examined in the following order:
H0={+,+,+}
H1={+,+,−}
H2={+,−,+}
H3={+,−,−}
H4={−,+,+}
H5={−,+,−}
H6={−,−,+}
H7={−,−,−}

During a step E511, we first consider two first assumptions H0, H1 such that their combinations differ only in the value of one and the same sign, for example the first one. The result is then H0={+,+,+} and H1={+,+,−}. In E512 the pixel vectors of VPH0 and VPH1 associated with each of these assumptions are calculated by inverse transform of the coefficient vectors obtained from the vector of transformed coefficients VC of the current block by assigning thereto the signs of the assumption considered. The vectors VPH0 and VPH1 obtained are stored in memory.

During a step E52, a first pattern vector VM2 is calculated by difference between the pixel vectors VPH0 and VPH1 associated with the assumptions H0 and H1. It is understood that according to this first embodiment of the invention, this pattern vector is associated with a value change of the sign s2 and represents in some way an impact of the change of the sign s2 between the combination of signs of H0 and that of H1 in the spatial domain.

We then consider in E511 a third first assumption H2, according to the predetermined order. Its combination of signs is {+, −, +} and differs from H0 by the value of the sign s1. The vector of corresponding pixels VPH2 is then calculated in E512 in a conventional manner, by applying an inverse transform and stored in memory. During a step E52, a second pattern vector VM1 is calculated by difference between the pixel vectors VPH0 and VPH2 associated with the assumptions H0 and H2. This pattern vector is associated with the sign change of the sign s1 between the assumptions H0 and H2. It is stored in memory.

During a step E53, a fourth assumption H3 is considered, whose combination is {+, −, −}. It differs from H2 by the value of the sign s2.

Advantageously, which previously calculated assumption differs only from a sign with the current H3 assumption is identified and its sign is also identified. In the present case, H2 is identified and the sign which differs between the current combination and that of assumption H2 is the sign s2. The memory will be scanned for finding the vector VPH0 and the vector pattern VM2.

According to the invention, a pixel vector VPH3 associated with this assumption H3 is constructed in E54 by linear combination of the vector of pixels VPH0 and the vector pattern VM2 as follows:

$$VPH3 = VPH0 + VM2$$

The application of an inverse transform is thus avoided.

According to a variant, the vector VPH0 and the pattern vector VM2 to be combined are obtained in a predefined table and stored in memory, so as to avoid the previous step of identification.

In E55, any assumption to be processed is investigated. If yes, for the following assumptions, the process is as follows:

Let us consider the assumption H4 corresponding to the combination {−, +, +}.

Its pixel vector VPH4 is calculated by applying an inverse transform and stored in memory.

A pattern vector VM0 is calculated by vector difference between VPH4 and VPH0. It is associated with a sign change of the sign s0. It is stored in memory for later use.

For the assumption H5 corresponding to the combination {−, +, −}, its pixel vector VPH5 is calculated by linear combination of VPH4 and of the pattern vector VM2.

The assumption H6 corresponding to the combination {−, −, +}. Its pixel vector VPH6 is obtained for example by linear combination of VPH4 and the pattern vector VM1. VPH2 and VM0 could also be combined.

The assumption H7 corresponding to the combination {−, −, −}. Its pixel vector VPH7 is obtained for example by linear combination of VPH6 and the pattern vector VM2.

Note that this embodiment implements 4 transforms for 3 signs to be predicted. More generally, according to this approach, if M signs are to be predicted, the prior art requires the calculation of $2^M$ inverse transforms, whereas the proposed method requires only M+1 transformed. The invention therefore allows a substantial reduction in complexity. Furthermore, when a vector of coefficients is decoded by adding pattern vectors, the value is likely to be slightly different from that obtained classically by inverse transform. However, the error is in general negligible and has no impact on the compression efficiency of the sign prediction method.

In relation to FIG. 6, a second embodiment of the invention will now be described.

A sequence of M=3 signs to be predicted SP={s0, s1, S2} is again considered.

During a previous step E5'11, the vector of transformed coefficients VC of the current residual block is considered and M=3 pattern vectors of coefficients from the vector of transformed coefficients VC of the current block are constructed, as follows:

a pattern vector of coefficients VMCj associated with the sign sj, with j an integer between 0 and 2, has the same dimension as the vector of coefficients VC and it is constructed while keeping the amplitude of the coefficient of the vector VC corresponding to the position of the sign sj, all the other coefficients being set to zero.

Regarding the sign of the non-zero coefficient, it can be chosen arbitrarily. For simplicity it is allocated the value +. In this case, the coefficient of the pattern vector corresponding to the position of the sign sj takes the absolute value of the co-located coefficient in the vector VC of the current block.

For example, the vectors of coefficients VC are assumed to be {+4, 0, −2, −3, 0, +1, 0, 0, −1, 0, 0, . . . , 0} and the three signs to be predicted are associated with the first, third and fourth coefficients. It is therefore {+, −, −}.

The three following coefficients pattern vectors VMC0, VMC1, VMC2 are obtained in such a case:
VMC0={+4, 0, 0, 0, 0, 0, 0, 0, 0, 0, 0, . . . , 0}
VMC1={0, 0, +2, 0, 0, 0, 0, 0, 0, 0, 0, . . . , 0}
VMC2={0, 0, 0, +3, 0, 0, 0, 0, 0, 0, 0, . . . , 0}

In E5'11, these patterns vectors of coefficients are transformed into in pixel pattern vectors VM'0, VM'1, VM'2 conventionally, by applying a conventional inverse transform. They are stored in memory.

Since the coefficient pattern vectors comprise a single non-zero coefficient, the application of the inverse transform generates a very moderate calculation cost. Indeed, for a current block of size N×N pixels of which all the coefficients are likely to be non-zero, for a normal inverse transform N×N projections on basic vectors of dimension N×N are necessary. We need $N^4$ multiplications and $N^4$ additions. However, the fact that a priori only one pixel is not zero, there remains more than one projection to be carried out, i.e. or $N^2$ multiplications and $N^2$ additions.

In E5'21, a first assumption to be processed is selected, according to a predetermined scanning order of the $2^M$ assumptions, for example the order of the Gray code.

It is in this case the assumption H0 equal to $\{+, +, +\}$. In E5'22, the vector of associated pixels VP0 is constructed by inverse transformation of the coefficient vector obtained from the vector of transformed coefficients VC of the current block by assigning thereto the signs of the assumption H0. The vector VPH0 obtained is stored in memory.

The following assumptions are now processed by iterating the succession of following steps, starting from i=1:

In E5'31, an assumption Hi is considered, for example H1. H1 is associated with the combination $\{+, +, -\}$.

In E5'32, which previously calculated assumption differs only from a sign with the current assumption is identified and its sign is also identified. In this case, the previous assumption identified is H0 and the sign that differs between the current combination and that of assumption H 0 is the sign s2.

In E5'33, the vector of pixels VPH0 associated with the assumption H0 is read in memory and in E5'34 the vector pattern VM'2 associated with the coefficient of the vector VC bearing the sign s2, is read in memory.

It will be noted that, according to a variation, the pixel vector VPH0 associated with the assumption H0 and the pattern vector VM'2 are obtained by reading from a predefined table of a record associated with the current assumption H1.

In E5'4, the pixel vector VPH 1 associated with the assumption H0 is constructed by linear combination of the vector VP0 and the vector pattern VM'2 as follows:

$$VPH1 = VPH0 - 2 \times VM'2$$

In E5'5, any assumptions to be processed are investigated. If yes, i is incremented and the method resumes at step E5'31.

For assumption H2 associated with the combination $\{+,-,+\}$, which previously calculated assumption differs only from a sign with the current assumption is identified and its sign is also identified. In the present case, the assumption is H0 and the sign that differs between the current combination and that of the assumption H0 is the sign s1. VP2 is calculated by linear combination of the vector VPH0 and of the pattern vector VM'1 as follows:

$$VPH2 = VPH0 - 2 \times VM'1$$

VPH2 is stored in memory.

For the assumption H3 associated with the combination $\{+,-,-\}$, which previously calculated assumption differs only from a sign with the current assumption is identified and its sign is also identified. In this case, the assumption is H2 and the sign that differs between the current combination and that of assumption H2 is the sign s2.

VPH3 is therefore calculated for example by linear combination of VPH2 and VM'2 as follows:

$$VPH3 = VPH2 - 2 \times VM'2$$

VPH3 is stored in memory.

We note that we could also combine VPH1 and VM'1.

For the assumption H4 associated with the combination $\{-, +, +\}$, VPH4 is calculated for example by linear combination of VPH0 and VM'0 in the following way:

$$VPH4 = VPH0 - 2 \times VM'0$$

VPH4 is stored in memory.

For the assumption H5 associated with the combination $\{-, +, -\}$, VPH5 is calculated for example by linear combination of VPH4 and VM'2 in the following way:

$$VPH5 = VPH4 - 2 \times VM'2$$

VPH5 is stored in memory.

For the assumption H6 associated with the combination $\{-, -, +\}$, VPH6 is calculated for example by linear combination of VPH2 and VM'0 in the following way:

$$VPH6 = VPH2 - 2 \times VM'0$$

VPH6 is stored in memory.

For the assumption H7 associated with the combination $\{-, -, -\}$, VPH7 is calculated for example by linear combination of VPH3 and VM'0 in the following way:

$$VPH7 = VPH3 - 2 \times VM'0$$

VPH7 is stored in memory.

For simplicity, it has been chosen in this example to favour the combinations of a vector pixel with a vector pattern because they generate fewer operations, but it should be noted that a vector with two pattern vectors could also be combined when the identified assumption presents two signs distinct from that of the current assumption.

Note that this embodiment also implements 4 transforms for 3 signs to be predicted. In addition, the transforms implemented to calculate the M pattern vectors VM'j are not very complex, since the coefficient pattern vectors VMCj only include a non-zero coefficient. This second embodiment is therefore even more economical in operations than the previous one.

The vectors or sub-vectors of pixels VPHi of the current block are now available for each of the assumptions of sign combinations.

During a step E56, the costs associated with each of the assumptions are calculated from the vectors obtained and from a cost function FC.

During a next step E57, the purpose is to decide on the predicted sequence from the costs that have just been calculated. There are different approaches to exploit the costs associated with each of the assumptions. An exemplary method will now be detailed.

The following substeps are iterated:

First iteration (coding of the first sign)

Using the cost function FC, the costs corresponding to each possible assumption are generated for all the signs to be predicted. Thus, let us assume that the number of signs to be predicted is M=3, and that the sequence of signs to be predicted is SP={s0, s1, s2}. We will generate the following costs:

C0=FC($\{+,+,+\}$)
C1=FC($\{+,+,-\}$)
C2=FC($\{+,-,+\}$)
C3=FC($\{+,-,-\}$)
C4=FC($\{-,+,+\}$)
C4=FC($\{-,+,-\}$)

C6=FC({−,−,+})
C7=FC({−,−,−})

We begin by identifying the assumption that obtained the minimal cost. Let us assume that it is H3. Then, the first sign in the predefined order s0 is predicted by the value it has in the combination of H3: it is a +. Then, the predicted value is compared to the actual value of s0 in the actual pixel vector of the current block.

This comparison makes it possible to define the value of a prediction indicator IP intended to be coded and then transmitted in the bitstream.

As described in document FR3023112, this indicator indicates whether the predicted sign s0 is equal to or different from the real sign (for example, respectively 0 or 1a). If we take the previous example {+4, 0, −2, −3, 0, +1, 0, 0, −1, 0, 0, . . . , 0}, it is a +. There is then coding of an indicator 0. This value IPs0 is stored in memory.

During a second iteration (coding of the second sign s1), the costs for which s1 does not have its real value are eliminated. Here, the real value of s0 is +, so we keep the following costs:

C1=FC({+,+,+})
C2=FC({+,+,−})
C3=FC({+,−,+})
C4=FC({+,−,−})

We thus have the 4 costs corresponding to the 4 possible assumptions on the signs that remain to be predicted. We will identify the minimum cost: let us assume that it is C3. Then, the second sign in the predefined order s1 is predicted by the value it has in the combination of H3: it is −. Then, the predicted value is compared to the actual value of s 1. In our example, the actual value is −. There is then coding of an indicator IP equal to 0. This value IPs1 is stored in memory.

During a third iteration (coding of the last sign s2), the costs for which s2 does not have its real value are eliminated. Here, the real value of s2 is −, so we keep the following costs:

C3=FC({+,−,+})
C4=FC({+,−,−})

We thus have the 2 costs corresponding to the 2 possible assumptions on the signs that remain to be predicted. We will identify the minimum cost: let us assume that it is C4. Then, the last sign in the predefined order s2 is predicted by the value it has in the combination of H4: it is −. Then, the predicted value is compared to the actual value of s3. In our example, it is is −. The indicator IP is therefore set to the value IPs3=0 for the sign s3.

We have now completed the prediction step E5 and we have a prediction of the signs of the current residual block.

In relation with FIG. 2, the coding of the current block is continued.

In E6, the values of indicators IP decided during the preceding step of sign prediction are coded. Since only the signs that are associated with a representative score of a sufficient reliability level are predicted, the prediction indicator more often takes the value 1 than the value 0. This is exploited by the entropy coding for reducing the size of the compressed signal.

Advantageously, the entropy coding takes into account the score $S_j$ associated with the predicted sign for coding the indicator IP. For example, in the embodiment of the invention in which the score has a value between 0 (low reliability of the prediction) and 10 (high reliability of the prediction), the entropic coding of the indicators is parametered taking into account the score, so as to exploit the more or less uniform distribution of the indicators. For example, CABAC-type entropic coding, known from the HEVC standard, is used by initializing the probabilities used in CABAC based on the predetermined scores.

In E7, the decoded block is reconstructed by applying to the quantized residual RQ the steps of dequantisation and inverse transform (known per se). A decoded residual block RD is obtained. RD is added the predictor block P to obtain the decoded block BD.

During this step, the decoded block BD is also added to the reconstructed image ID. This makes it possible to have in the encoder a decoded version of the current image. This decoded version is used in particular during the step of constructing a prediction of the signs selected to be predicted.

In E8, the values encoded in the bitstream TB are inserted.

During this step E9, whether the current block is the last block to be processed will be tested, given the browsing order defined previously. If yes, the coding unit has finished processing. If no, the next step is the step of selecting the next block.

During this step E0, the next block to be processed by the encoding unit is selected, according to the sequence defined previously. This block becomes the current block to be processed, and the next step is the step of testing E1 the current block.

In relation to FIG. 7, the steps of a method of decoding a coded digital image according to an embodiment of the invention are described. It is assumed that the bitstream TB has been received by a decoding device implementing the decoding method according to the invention. In a variation, the decoding device obtains a compressed file FC.

In D0, the first block to be processed is initially selected as the current block C'. For example, this is the first block (in lexicographic order). This block comprises for example N×N pixels. As already mentioned for coding, the invention would also apply to a rectangular block.

In D1, the current block C' is processed by implementing the decoding scheme corresponding to the coding scheme used by the encoder, for example as specified in the HEVC standard. In particular, during this step, it identifies a set of elements ED of data description to be decoded for the current block C'.

In addition, a prediction P' of the block to be decoded C' is produced. The prediction information related to P' is read in the bitstream or in the compressed file and then decoded. Thus, the prediction mode information mj is therefore decoded.

The amplitude information of the residue to be decoded RQ' is also decoded into the bitstream or the compressed file and then decoded. We now know the amplitudes of RQ'[i], but not yet the signs.

In D2, the decoding method according to the invention implements the step of selecting the signs to be predicted from the identified description elements. This step has already been described in detail for the coding method in relation to FIG. 2. The signs to be predicted are advantageously selected according to predetermined scores. A subset SP is obtained.

During a step D3, the method reads in the bitstream TB the coded data relating to the signs of the coefficients of the unpredicted current block and decodes them with means adapted to those used during coding (typically binary decoding). In particular, entropy decoding uses the probability pi obtained previously.

In D4, the elements of the set SP obtained in an initial sequence SSP are ordered, for example by decreasing scores, as already described for the coding method according to the invention.

In D5, the sign values of the SSP sequence are predicted. To do so, the best combination in the sense of a cost function FC is selected among the combinations of possible values of the current sequence SP. As already mentioned for the coding method, there are several cost functions. In the following, the same as that of the coding method is used, for example a measurement of distortion along a boundary with previously processed blocks, and the combination of values which minimises this measurement is selected.

To obtain the costs associated with $2^M$ combinations of signs in each case, it is necessary to calculate pixel vectors VPHi corresponding to the values of the values of the current residual block for the combination of signs of the assumption Hi.

In the state of the art it was necessary to completely recalculate these vectors. This process is computationally intensive, in particular because the calculation of the residual vector VPHi requires the application of an inverse transform each time, which requires significant computational resources.

To avoid having to calculate all of these inverse transform, the invention described in connection with the FIGS. 4, 5 is applied again, for example by implementing one of the embodiments already described in relation with FIGS. 5 and 6.

In D6, the values of the prediction indicators IP read in the bitstream or the compressed file for the signs of the sequence SP are decoded.

In D7, the decoded signs are reconstructed from the indicator values IP decoded and the predicted values.

The next step D8 is for reconstructing the current block C' from the description elements decoded, EP predicted ($D_5$) and ENP not predicted ($D_3$), the amplitude information of the residual block coefficients RQ' and the prediction P' obtained in $D_1$.

To do this, we first dequantize the RQ' block to obtain a dequantized block. This is done by means adapted to the quantization used during the coding (scalar dequantization, vector dequantization . . . ), known to those skilled in the art.

The dequantized residue is then subjected to a reverse transform from that used in the coding. The decoded residue is then obtained.

Lastly, the decoded block BD' is reconstructed by adding the decoded residue to the prediction P'.

This block is integrated with the image being decoded.

During a step D9, whether the current block is the last block to be processed is tested, given the scanning order of the blocs, as defined previously. If yes, the decoding is complete. If not, the next step is the step $D_0$ for selecting the next block and the steps of the decoding method are repeated.

According to one embodiment of the invention which will now be detailed with reference to FIG. 8, the prediction step D5 and the step D6 of decoding the signs of the sequence SSP are combined in a single step D'5:

In $D'5_1$, a current sequence $Seq_c$ that is initialised to the initial sequence SP is considered.

The following steps ($D'5_2$ to $D'5'_6$) form an iterative loop that will be repeated several times, depending on the M number of signs to be predicted, selected from $Seq_c$.

In $D'5_2$, the best combination within the meaning of a cost function FC is selected, the same as that used by the coding method which produced the bitstream to be decoded, from the combinations of possible values for the current sequence SP.

During a first iteration, the first sign of the sequence $Seq_c$ is decoded. With the aid of the cost function, the costs corresponding to each assumption or possible combination for the set of signs to be predicted are generated, using the solution of the invention, which has just been described in connection with FIG. 7.

Thus, let us assume that the number of signs to be predicted is equal to M=3, and $Seq_c = \{s_0, s_1, s_2\}$. We will generate the following costs:
$C_0 = FC(\{+,+,+\})$
$C_1 = FC(\{+,+,-\})$
$C_2 = FC(\{+,-,+\})$
$C_3 = FC(\{+,-,-\})$
$C_4 = FC(\{-,+,+\})$
$C_5 = FC(\{-,+,-\})$
$C_6 = FC(\{-,-,+\})$
$C_7 = FC(\{-,-,-\})$ We thus have the 8 costs corresponding to the 8 possible assumptions on the signs that remain to be predicted. The minimum cost is assumed to be $C_2$.

In $D'5_3$, the value of the first sign s0 is predicted by its value in the combination corresponding to the assumption H2. This is +.

In $D'5_4$, the prediction indicator IP is decoded for that first sign s0, from coded data extracted from the bitstream or compressed file. This indicator indicates whether the predicted sign has been correctly predicted or not. For example, let us assume that the decoded value is 0 and is associated with a correct prediction.

In $D'5_5$, it is deduced that the decoded value of the sign s0 is +.

In $D'5_6$, we test whether the sign s0 is the last of the current sequence. If this is the case, the processing ends. Otherwise, the current sequence is updated in $D'5_7$ by deleting the element s0 which has just been decoded.

During a second iteration, the second element $s_1$, which has then become the first one in the current sequence, is processed.

In $D'5_2$, the combinations $Cb_k$, where $s_0$ is the decoded value, the others being discarded, are considered.

In the example considered, the actual value of $s_0$ is −, so the following costs are compared:
$C_0 = FC(\{+,+,+\})$
$C_1 = FC(\{+,+,-\})$
$C_2 = FC(\{+,-,+\})$
$C_3 = FC(\{+,-,-\})$ These 4 costs correspond to the 4 possible assumptions on the signs that remain to be predicted, knowing the decoded value of the one that has already been processed.

$C_1$ is identified as the minimum cost.

In $D'5_3$, $s_1$ is predicted by its value in the combination of assumption H1, that is to say +.

In $D'5_4$, the indicator IP corresponding to $s_1$ is decoded from the coded data extracted from the bitstream or compressed file. An indicator is decoded, which indicates whether the predicted sign is equal to or different from the actual sign. In our example, let us assume that the decoded value of IP is 0, which means that the prediction of this sign is correct.

In $D'5_5$, it follows that s1 is −.

In $D'5_6$, it is tested whether s is the last element. Since this is not the case, the current sequence in $D'5_7$ is updated, by removing s1. The new sequence $Seq_c$ is reduced to the element $s_2$.

During a third and last iteration, the last sign $s_2$ is decoded.

In $D'5_2$, the combinations of values of the original sequence Seq, are considered, for which the elements of description already processed s0 and s1 take on their decoded value.

The following costs are therefore compared:
$C_2 = FC(\{+,-,+\})$
$C_3 = FC(\{+,-,-\})$
$C_3$ is identified as the minimum cost.

Then, the last sign $s_2$ in the predefined order is predicted, in $D5_3$, by its value in the combination of assumption H3: it is −.

Then, an indicator IP associated with the sign $s_2$ is decoded at $D5_4$. It indicates whether the sign $s_2$ has been correctly predicted or not. In our example, let us assume that the decoded value of IP is 0, which corresponds to a correct prediction.

It is deduced in $D'5_5$ that the decoded value of $s_2$ is the sign +.

In $D'5_6$, we find that $s_2$ is the last element to be processed.

As for the encoding, it will be noted that the invention is not limited to the embodiment that has just been presented. Other implementation choices can be made, such as the one to keep the sequence at its original length, to update the index of the current element, initialised to the first description element $ED_0$, and to terminate the iterations once the last element $ED_{M-1}$ has been processed.

According to this embodiment of the invention, since all the elements of the initial sequence selected according to the predetermined scores are predicted, it is therefore known as of the outcome of step $D_2$ how many prediction indicators IP are to be extracted from the bitstream or compressed file. It will be understood that this makes it possible to implement the invention in such a way that it decorrelates the reading and parsing operations of the coded data contained in the bitstream or compressed file of the current block processing operations in accordance with the coding/decoding scheme implemented. For example, the decoding could be organised by using a specific component for the parsing/reading of the coded data in the bitstream and another for the reconstruction operations of the decoded blocks. An advantage of this parsing independence is to allow parallelisation of the decoding operations.

The encoding and decoding methods described above can be integrated into standard video encoders/decoders such as HEVC/H.265, AVC/H.264 or any type of proprietary video encoders/decoders. The coding and decoding methods according to the invention also apply to all types of coders/decoders of still images and more generally of signals using a predictive coding process.

The coding and decoding methods have been previously described in the case of the prediction of the signs of the coefficients of a residue block of the image to be encoded/decoded. These methods are easily applicable to the case of the prediction of another block description element for example.

FIG. 9 shows the simplified structure of a coding device 100 adapted to implement the coding method according to any of the particular embodiments of the invention. The coding device 100 is adapted to encode at least one image in the form of a coded data stream, said image being divided into blocks.

The coding device 100 is notably configured for:
Processing the current block for providing a vector of transformed coefficients;
Selecting a sequence of N signs of coefficients to be predicted in the coefficient vector, with N being an integer greater than or equal to 2;
Predicting values of the signs of the sequence from a plurality of assumptions of combinations and a cost function;
For a sign of the sequence, coding an indicator representative of a difference between its actual value and its predicted value;
According to the invention the prediction comprises:
obtaining at least one pattern vector of dimension equal to that of a vector of coefficients, from the vector of transformed coefficients;
for at least one first assumption, obtaining a virtual pixel vector by transforming a coefficient vector associated with the first assumption; and
for at least one second assumption, so-called current assumption:
obtaining a pixel vector associated with the current assumption, distinct from the first assumption, by linear combination of at least one pixel vector associated with the first assumption and said at least one pattern vector;
calculating the cost function for the current assumption from the pixel vector obtained.

The device 100 is further configured to implement the various embodiments of the invention which have just been described in relation to FIGS. 2, 5 and 6.

According to a particular embodiment of the invention, the steps of the coding method are implemented by computer program instructions. To do so, the coding device 100 has the conventional architecture of a computer and notably comprises a memory MEM1, a processing unit UT1, equipped for example with a microprocessor µ1, and driven by the computer program Pg1 stored in the memory MEM1. The computer program Pg1 includes instructions for implementing the steps of the coding method as described above, when the program is executed by the processor PROC.

At initialisation, the code instructions of the computer program Pg1 are for example loaded into a RAM before being executed by the processor PROC. The processor µ1 of the processing unit UT1 implements in particular the steps of the coding method described above, according to the instructions of the computer program Pg1.

According to another particular embodiment of the invention, the coding method is implemented by functional modules or units. For this purpose, the coding device 100 furthermore comprises the following modules:
Processing (PROC) the current block for providing a vector of transformed coefficients;
Selecting (SEL SP) a sequence of N signs of coefficients to be predicted in the coefficient vector, with N being an integer greater than or equal to 2;
Predicting (PRED) values of the signs of the sequence from a plurality of assumptions of combinations and a cost function;
For a sign of the sequence, coding (COD IP) an indicator representative of a difference between its actual value and its predicted value.

According to the invention, the prediction module comprises the following units:
for at least one second assumption, so-called current assumption:
Obtaining a pixel vector associated with the current assumption, by linear combination of at least one pixel vector associated with at least one first assumption and obtained by transforming a vector of coefficients comprising the signs of the combination of the first assumption and at least one pattern vector obtained from the vector of transformed coefficients; and Calculating the cost function for the current assumption from the pixel vector obtained.

The processing unit UT1 cooperates with the various functional modules described above and the memory MEM1 in order to implement the steps of the coding method.

According to one embodiment of the invention, the device 100 further comprises a unit $M_1$ for storing the coding contexts of the coefficients, predetermined scores associated with each of these contexts, the pixel vectors associated with the $2^M$ assumptions for the sequence of signs to predict, their related costs, as well as the pattern vectors from which the pixel vectors are derived.

These units are driven by the processor µ1 of the processing unit 110.

Advantageously, such a device 100 can be integrated in a user terminal equipment TU, such as an encoder, a personal computer, a tablet, a digital camera, a smart phone, etc. The device 100 is then arranged to cooperate at least with the next module of the terminal TU:

a data transmission/reception module E/R, through which the bitstream TB or the compressed file FC is transmitted over a telecommunications network, for example a wired network or a radio network.

The various functional modules described above can be in hardware and/or software form. Under a software form, such a functional module may include a processor, a memory and program code instructions for implementing the function corresponding to the module when the code instructions are executed by a processor. In a material form, such a functional module can be implemented by any type of suitable coding circuits, such as for example and without limitation microprocessors, Digital Signal Processors (DSPs), Application Specific Integrated Circuits (ASICs), Field Programmable Gate Arrays (FPGAs), a logic unit wiring.

FIG. 10 shows the simplified structure of a decoding device 200 adapted to implement the decoding method according to any of the particular embodiments of the invention which have just been described in connection to FIGS. 7, 8, 5 and 6. The decoding device 200 is adapted to decode at least one image in the form of a coded data stream representative of at least one image, said image being divided into blocks. The decoding device 200 is notably configured for:

Decoding (DEC RQ) the amplitudes of the coefficients of the vector of transformed coefficients, extracted from the bitstream (TB);

Selecting (SEL' SP) a sequence of N signs of coefficients to be predicted in the coefficient vector, with N being an integer greater than or equal to 2;

Predicting (PRED') values of the signs of the sequence from a plurality of assumptions of combinations and a cost function;

Decoding (DEC IP) values of a prediction indicator of the signs selected from coded data extracted from the bitstream, the prediction indicator of a sign being indicative of a difference between its actual value and its predicted value;

Calculating (CALC) the decoded values of the selected signs from the decoded prediction indicator values;

Reconstructing (RECONST) coefficients of the block from decoded amplitudes and decoded signs;

According to the invention, the prediction moreover includes:

for at least one second assumption, so-called current assumption:

Obtaining a pixel vector associated with the current assumption, by linear combination of at least one pixel vector associated with at least one first assumption and obtained by transforming a vector of coefficients comprising the signs of the combination of the first assumption and at least one pattern vector obtained from the vector of transformed coefficients; and Calculating the cost function for the current assumption from the pixel vector obtained.

According to a particular embodiment of the invention, the decoding device 200 has the conventional architecture of a computer and notably comprises a memory MEM2, a processing unit UT2, equipped for example with a microprocessor µ2, and driven by the computer program Pg2 stored in the memory MEM2. The computer program Pg1 includes instructions for implementing the steps of the decoding method as described above, when the program is executed by the processor µ2.

At initialisation, the code instructions of the computer program Pg2 are for example loaded into a RAM before being executed by the processor µ2. The processor µ2 of the processing unit UT0 implements in particular the steps of the decoding method described above, according to the instructions of the computer program Pg2.

According to another particular embodiment of the invention, the decoding method is implemented by functional modules. For this purpose, the decoding device 200 furthermore comprises the following modules:

Decoding (DEC C) the amplitudes of the coefficients of the vector of transformed coefficients of a current block, extracted from the bitstream (TB);

Selecting (SEL' SP) a sequence SP of N signs of coefficients to be predicted in the coefficient vector, with N being an integer greater than or equal to 2;

Predicting (PRED') values of the signs of the sequence from a plurality of assumptions of combinations and a cost function;

Decoding (DEC IP) values of a prediction indicator of the signs selected from coded data extracted from the bitstream, the prediction indicator of a sign being indicative of a difference between its actual value and its predicted value;

Calculating (CALC) the decoded values of the selected signs from the decoded prediction indicator values;

Reconstructing (RECONST) the coefficients of the block from decoded amplitudes and decoded signs;

According to the invention, the prediction module moreover includes:

for at least one second assumption, so-called current assumption:

Obtaining a pixel vector associated with the current assumption, by linear combination of at least one pixel vector associated with at least one first assumption and obtained by transforming a vector of coefficients comprising the signs of the combination of the first assumption and at least one pattern vector obtained from the vector of transformed coefficients; and Calculating the cost function for the current assumption from the pixel vector obtained.

The processing unit UT2 cooperates with the various functional modules described above and the memory MEM2 in order to implement the steps of the decoding method.

The device 200 furthermore comprises a unit $M_2$ for storing the predetermined scores or correct detection probability used to select the signs to be predicted, pixel vectors corresponding to the $2^M$ sign combination assumptions to be predicted, their related costs as well as the pattern vectors from which the pixel vectors are derived.

These units are driven by the processor µ2 of the processing unit UT2.

The various functional modules described above can be in hardware and/or software form. Under a software form, such a functional module may include a processor, a memory and program code instructions for implementing the function corresponding to the module when the code instructions are executed by a processor. In a material form, such a functional module can be implemented by any type of suitable coding circuits, such as for example and without limitation microprocessors, Digital Signal Processors (DSPs), Application Specific Integrated Circuits (ASICs), Field Programmable Gate Arrays (FPGAs), a logic unit wiring.

Advantageously, such a device 200 can be integrated into a user terminal TU, for example a decoder, a Set-Top-Box, a digital television, a computer, a tablet, a smartphone, etc. The device 200 is then arranged to cooperate at least with the next module of the terminal UT:

a data transmission/reception module E/R, through which the bitstream TB or the compressed file FC is transmitted in a telecommunications network.

a module DISP for displaying decoded digital images.

The invention which has just been presented can find many applications, in particular in the context of video signal compression, audio (speech, sound), still images, images acquired by an medical imaging module. It applies for example to two-dimensional (2D), three-dimensional (3D) contents including a depth map, or multispectral images (whose colour intensities are different from the three red green blue bands) or finally to full images.

An exemplary embodiment of invention particularly aims to overcome the disadvantages of the prior art.

An exemplary embodiment of the invention proposes a solution that considerably simplifies the process of predicting signs without impacting compression performance.

It goes without saying that the embodiments which have been described above have been given for purely indicative and non-limiting reasons, and that many modifications can easily be made by those skilled in the art without departing from the scope of the invention.

The invention claimed is:

1. A method for coding a digital image, said image being divided into a plurality of blocks of pixels processed in a defined order, said method comprising the following acts, implemented by a coding device for a current block:

processing the current block to provide a vector of transformed coefficients;

selecting a sequence of M signs of coefficients to be predicted in the coefficient vector, with M being an integer greater than or equal to 2;

predicting values of the signs of the sequence from a plurality of assumptions of combinations and a cost function;

for a sign of the sequence, coding an indicator representative of a difference between its actual value and its predicted value;

wherein the predicting comprises the following sub-acts for at least one second assumption, called a current assumption:

obtaining a pixel vector associated with the current assumption, by linear combination of a pixel vector associated with at least a first assumption previously processed and different from the current assumption by the value of at least one sign (sj), with j an integer between 0 and M, and obtained by transforming a coefficient vector comprising the combination of signs of the first assumption, and at least one pixel pattern vector obtained by transforming a coefficient vector associated with said at least one sign (sj) of the sequence, of the same dimension as the vector of transformed coefficients, and comprising an amplitude coefficient equal to that of said vector at the position of the coefficient corresponding to the sign (sj) in said vector, all the other coefficients being set to zero;

calculating the cost function for the current assumption from the pixel vector obtained.

2. A method for decoding a digital image from a bitstream, said image being divided into a plurality of blocks processed in a defined order, the bitstream comprising, for a block, coded data representative of a vector of transformed coefficients, said method comprising the following acts, implemented by a decoding device for the block, called a current block:

decoding the amplitudes of the coefficients of the vector of transformed coefficients, extracted from the bitstream;

selecting a sequence of M signs of coefficients to be predicted in the coefficient vector, with M being an integer greater than or equal to 2;

predicting values of the signs of the sequence from a plurality of assumptions of combinations and a cost function;

decoding values of a prediction indicator of the signs selected from coded data extracted from the bitstream, the prediction indicator of a sign being indicative of a difference between its actual value and its predicted value;

calculating the decoded values of the selected signs from the decoded prediction indicator values and the predicted values;

reconstructing coefficients of the block from decoded amplitudes and decoded signs;

wherein the predicting comprises the following sub-acts for at least one second assumption, so-called current assumption:

obtaining a pixel vector associated with the current assumption, by linear combination of a pixel vector associated with at least a first assumption previously processed and different from the current assumption by the value of at least one sign (sj), with j an integer between 0 and M, and obtained by transforming a coefficient vector comprising the combination of signs of the first assumption and at least one pixel pattern vector obtained by transforming a coefficient vector associated with said at least one sign (sj) of the sequence, of the same dimension as the vector of transformed coefficients, and comprising an amplitude coefficient equal to that of said vector at the position of the coefficient corresponding to the sign (sj) in said vector, all the other coefficients being set to zero;

calculating the cost function for the current assumption from the pixel vector obtained.

3. The method according to claim 1 the act of obtaining at least one pattern vector is implemented M times and the act of obtaining a pixel vector by transforming at least one vector of coefficients is carried out for M+1 first assumptions.

4. The method according to claim 1, wherein the sign of a non-zero coefficient is selected to be equal to +positive.

5. The method according to claim 1, wherein said at least one pattern vector is calculated in an act prior to the processing of the assumptions and stored in memory and the obtaining said at least one pattern vector comprises reading said memory.

6. The method as claimed in claim 5, wherein M vector patterns are calculated beforehand and the act of obtaining a pixel vector is performed for a single first assumption.

7. The method according to claim 1, wherein the cost function is calculated for a subset of the pixels of a pixel vector, said subset comprising at least the pixels located at a boundary of the current block with a neighbouring block already processed and the transforming act transforms the coefficient vector into a sub-vector of pixels corresponding to said subset.

8. A device for coding a digital image, said image being divided into a plurality of blocks of pixels processed in a defined order, said device comprising:
  a processor; and
  a non-transitory computer-readable medium comprising instructions stored thereon, which when executed by the processor configure the device to perform acts comprising:
  processing the current block for providing a vector of transformed coefficients;
  selecting a sequence of N signs of coefficients to be predicted in the coefficient vector, with N being an integer greater than or equal to 2;
  predicting values of the signs of the sequence from a plurality of assumptions of combinations and a cost function;
  for a sign of the sequence, coding an indicator representative of a difference between its actual value and its predicted value;
  wherein the predicting comprises for at least one second assumption called a current assumption:
    obtaining a pixel vector associated with the current assumption, by linear combination of a pixel vector associated with at least a first assumption previously processed and different from the current assumption by the value of at least one sign (sj), with j an integer between 0 and M, and obtained by transforming a coefficient vector comprising the combination of signs of the first assumption and at least one pixel pattern vector obtained by transforming a coefficient vector associated with said at least one sign (sj) of the sequence, of the same dimension as the vector of transformed coefficients, and comprising an amplitude coefficient equal to that of said vector at the position of the coefficient corresponding to the sign (sj) in said vector, all the other coefficients being set to zero;
  calculating the cost function for the current assumption from the pixel vector obtained.

9. A device for decoding a digital image from a bitstream, said image being divided into a plurality of blocks processed in a defined order, the bitstream comprising, for a block, coded data representative of a vector of transformed coefficients, said device comprising:
  a processor; and
  a non-transitory computer-readable medium comprising instructions stored thereon, which when executed by the processor configure the device to perform acts comprising:
  decoding the amplitudes of the coefficients of the vector of transformed coefficients, extracted from the bitstream;
  selecting a sequence of N signs of coefficients to be predicted in the coefficient vector, with N being an integer greater than or equal to 2;
  predicting values of the signs of the sequence from a plurality of assumptions of combinations and a cost function;
  decoding values of a prediction indicator of the signs selected from coded data extracted from the bitstream, the prediction indicator of a sign being indicative of a difference between its actual value and its predicted value;
  calculating the decoded values of the selected signs from the decoded prediction indicator values and the predicted values;
  wherein the predicting comprises, for at least one second assumption called a current assumption:
    obtaining a pixel vector associated with the current assumption, by linear combination of a pixel vector associated with at least a first assumption previously processed and different from the current assumption by the value of at least one sign (sj), with j an integer between 0 and M, and obtained by transforming a coefficient vector comprising the combination of signs of the first assumption and at least one pixel pattern vector obtained by transforming a coefficient vector associated with said at least one sign (sj) of the sequence, of the same dimension as the vector of transformed coefficients, and comprising an amplitude coefficient equal to that of said vector at the position of the coefficient corresponding to the sign sj in said vector, all the other coefficients being set to zero; and
  calculating the cost function for the current assumption from the pixel vector obtained.

10. The device as claimed in claim 8, wherein the device is comprised in a terminal equipment.

11. A non-transitory computer-readable medium comprising instruction stored thereon, which when executed by a processor of a coding device, configure the coding device to perform a method of coding a digital image, said image being divided into a plurality of blocks of pixels processed in a defined order, said method comprising the following acts, implemented for a current block:
  processing the current block to provide a vector of transformed coefficients;
  selecting a sequence of M signs of coefficients to be predicted in the coefficient vector, with M being an integer greater than or equal to 2;
  predicting values of the signs of the sequence from a plurality of assumptions of combinations and a cost function;
  for a sign of the sequence, coding an indicator representative of a difference between its actual value and its predicted value;
  wherein the predicting comprises the following sub-acts for at least one second assumption, called a current assumption:
    obtaining a pixel vector associated with the current assumption, by linear combination of a pixel vector associated with at least a first assumption previously processed and different from the current assumption by the value of at least one sign (sj), with j an integer between 0 and M, and obtained by transforming a coefficient vector comprising the combination of signs of the first assumption, and at least one pixel pattern vector obtained by transforming a coefficient vector associated with said at least one sign (sj) of the sequence, of the same dimension as the vector of transformed coefficients, and comprising an amplitude coefficient equal to that of said vector at the position of the coefficient corresponding to the sign (sj) in said vector, all the other coefficients being set to zero;

calculating the cost function for the current assumption from the pixel vector obtained.

12. A non-transitory computer-readable medium comprising instruction stored thereon, which when executed by a processor of a decoding device, configure the decoding device to perform a method of decoding a digital image from a bitstream, said image being divided into a plurality of blocks processed in a defined order, the bitstream comprising, for a block, coded data representative of a vector of transformed coefficients, said method comprising the following acts, implemented for the block, called a current block:

decoding the amplitudes of the coefficients of the vector of transformed coefficients, extracted from the bitstream;

selecting a sequence of M signs of coefficients to be predicted in the coefficient vector, with M being an integer greater than or equal to 2;

predicting values of the signs of the sequence from a plurality of assumptions of combinations and a cost function;

decoding values of a prediction indicator of the signs selected from coded data extracted from the bitstream, the prediction indicator of a sign being indicative of a difference between its actual value and its predicted value;

calculating the decoded values of the selected signs from the decoded prediction indicator values and the predicted values; reconstructing coefficients of the block from decoded amplitudes and decoded signs;

wherein the predicting comprises the following sub-acts for at least one second assumption, so-called current assumption:

obtaining a pixel vector associated with the current assumption, by linear combination of a pixel vector associated with at least a first assumption previously processed and different from the current assumption by the value of at least one sign (sj), with j an integer between 0 and M, and obtained by transforming a coefficient vector comprising the combination of signs of the first assumption and at least one pixel pattern vector obtained by transforming a coefficient vector associated with said at least one sign (sj) of the sequence, of the same dimension as the vector of transformed coefficients, and comprising an amplitude coefficient equal to that of said vector at the position of the coefficient corresponding to the sign (sj) in said vector, all the other coefficients being set to zero;

calculating the cost function for the current assumption from the pixel vector obtained.

13. The method according to claim 2 the act of obtaining at least one pattern vector is implemented M times and the act of obtaining a pixel vector by transforming at least one vector of coefficients is carried out for M+1 first assumptions.

14. The method according to claim 2, wherein the sign of a non-zero coefficient is selected to be equal to positive.

15. The method according to claim 2, wherein said at least one pattern vector is calculated in an act prior to the processing of the assumptions and stored in memory and the obtaining said at least one pattern vector comprises reading said memory.

16. The method as claimed in claim 15, wherein M vector patterns are calculated beforehand and the act of obtaining a pixel vector is performed for a single first assumption.

17. The method according to claim 2, wherein the cost function is calculated for a subset of the pixels of a pixel vector, said subset comprising at least the pixels located at a boundary of the current block with a neighbouring block already processed and the transforming act transforms the coefficient vector into a sub-vector of pixels corresponding to said subset.

18. The device as claimed in claim 9, wherein the device is comprised in a terminal equipment.

* * * * *